United States Patent
Held et al.

(10) Patent No.: US 7,825,163 B2
(45) Date of Patent: Nov. 2, 2010

(54) BIOLOGICALLY DEGRADABLE COMPOSITIONS

(75) Inventors: Uwe Held, Velbert (DE); Carsten Baumann, Cologne (DE); Sandra Heldt, Erkrath (DE); Horst-Dieter Schares, Erkrath (DE); Andreas Willing, Erkrath (DE)

(73) Assignee: Cognis IP Management GmbH, Duesseldorf (DE)

( * ) Notice: Subject to any disclaimer, the term of this patent is extended or adjusted under 35 U.S.C. 154(b) by 852 days.

(21) Appl. No.: 10/494,171

(22) PCT Filed: Oct. 24, 2002

(86) PCT No.: PCT/EP02/11901

§ 371 (c)(1),
(2), (4) Date: Nov. 9, 2004

(87) PCT Pub. No.: WO03/037495

PCT Pub. Date: May 8, 2003

(65) Prior Publication Data

US 2005/0065279 A1    Mar. 24, 2005

(30) Foreign Application Priority Data

Nov. 2, 2001  (DE)  ................ 101 54 103

(51) Int. Cl.
| | |
|---|---|
| *B01F 3/08* | (2006.01) |
| *B01F 17/42* | (2006.01) |
| *C08F 283/00* | (2006.01) |
| *C08J 3/02* | (2006.01) |
| *C11D 3/20* | (2006.01) |

(52) U.S. Cl. .......... 516/76; 516/204; 524/457; 525/911; 510/506; 510/524

(58) Field of Classification Search .......... 516/204, 516/76; 524/457; 525/911; 510/524, 506
See application file for complete search history.

(56) References Cited

U.S. PATENT DOCUMENTS

| | | | |
|---|---|---|---|
| 3,943,178 A | | 3/1976 | Stein et al. |
| 4,234,444 A | | 11/1980 | Wegener et al. |
| 4,303,544 A | | 12/1981 | Kosswig et al. |
| 4,338,212 A | * | 7/1982 | Wegener et al. ........ 516/DIG. 1 |
| 4,418,217 A | * | 11/1983 | Schmid et al. ......... 516/DIG. 1 |
| 4,521,326 A | * | 6/1985 | Seibert et al. ............... 510/405 |
| 4,774,017 A | * | 9/1988 | Seibert et al. ............... 568/625 |
| 4,976,885 A | * | 12/1990 | Wisotzki et al. ............. 510/432 |
| 5,346,973 A | | 9/1994 | Feustel et al. |
| 5,576,281 A | * | 11/1996 | Bunch et al. ................. 510/220 |
| 6,340,662 B1 | * | 1/2002 | Millhoff et al. ............. 510/417 |

FOREIGN PATENT DOCUMENTS

| | | |
|---|---|---|
| AT | 336 555 | 5/1977 |
| DE | 28 29 697 | 1/1980 |
| DE | 40 06 391 | 9/1991 |
| DE | 197 31 880 | 1/1999 |
| EP | 0 018 482 | 11/1980 |

* cited by examiner

*Primary Examiner*—Daniel S Metzmaier

(57) ABSTRACT

A process for making a biodegradable composition involving: (a) providing from about 20 to 80% by weight of $C_{8-22}$ fatty alcohol; (b) providing from about 20 to 80% by weight of a ring opening product of a $C_{8-18}$ 1,2-epoxyalkane with ethylene glycol; (c) combining (a) and (b) to form a reaction mixture; and (d) reacting the reaction mixture with ethylene oxide, with the proviso that the ethylene oxide is used in an amount of from about 5 to 100 mol ethylene oxide per mol of free OH groups present in the reaction mixture.

9 Claims, No Drawings

BIOLOGICALLY DEGRADABLE COMPOSITIONS

BACKGROUND OF THE INVENTION

This application is a 371 of PCT/EP02/11901 filed Oct. 24, 2002.

This invention relates to readily biodegradable and toxicologically safe compositions. The compositions according to the invention are obtainable by subjecting mixtures of $C_{8-22}$ fatty alcohols and ring opening products emanating from the reaction of $C_{8-18}$ 1,2-epoxyalkanes with ethylene glycol to ethoxylation.

DE 28 29 697 C2 describes liquid detergent compositions of addition products of ethylene oxide onto fatty alcohols and addition products of ethylene oxide onto internal vicinal alkanediols which do not gel on addition of water.

DE 40 06 391 A1 describes pourable liquid surfactant concentrates of nonionic surfactants and their use as emulsifiers in emulsion polymerization. These known surfactant concentrates contain on the one hand addition products of ethylene oxide onto primary alcohols and, on the other hand, reaction products of 5 to 25 mol ethylene oxide with 1 mol aliphatic vicinal terminal diols.

DE 197 31 880 A1 also describes pourable liquid surfactant concentrates of nonionic surfactants and their use as emulsifiers in emulsion polymerization. These surfactant concentrates are similar in their composition to those known from the above-cited DE 40 06 391 except that the second component (reaction product of ethylene oxide with aliphatic vicinal terminal diols) has a higher degree of ethoxylation (30 to 50).

DESCRIPTION OF THE INVENTION

The problem addressed by the present invention was to provide surfactant compositions which would be suitable on their own or in combination with other surfactants as emulsifiers for emulsion polymerization. These compounds would be able to be applied in the form of pourable liquid surfactant concentrates. When used as emulsifiers for emulsion polymerization, their effect would be in particular to minimize coagulation.

An important aspect of the problem stated above was that the compositions should be toxicologically safe. "Toxicologically safe" in the context of the invention is understood to mean that the aquatic toxicity as measured to DIN 38412, Part 9 (LC/EC 50 value) is above 1 mg/l and that the toxicity as measured by OECD Method 423 (LD 50 value) is above 2,000 mg/kg.

The ready biodegradability and toxicological safeness would not be achieved at the expense of the performance properties.

Another problem addressed by the present invention was to provide compositions which, when used as emulsifiers in emulsion polymerization, would lead to polymer dispersions (aqueous latices) with high freeze/thaw stability.

A further problem addressed by the present invention was to provide compositions which, when used as emulsifiers in emulsion polymerization, would lead to polymer dispersions (aqueous latices) with high electrolyte stability.

The present invention relates to biodegradable compositions obtainable by reacting a mixture of
a) 20 to 80% by weight of one or more $C_{8-22}$ fatty alcohols and
b) 20 to 80% by weight of one or more ring opening products of $C_{8-18}$ 1,2-epoxyalkanes with ethylene glycol, with ethylene oxide, with the proviso that the ethylene oxide is used in a quantity of 5 to 100 mol per mol of free OH groups present in the sum total of compounds a) and b) used.

The following observations apply to the two classes of compounds used (together) in the ethoxylation reaction:

$C_{8-22}$ fatty alcohols are known to the expert. They may be used individually or in combination. Substantially saturated and unsaturated fatty alcohols, i.e. fatty alcohols with an iodine value below 60, are preferred. The following fatty alcohols are most particularly preferred: lauryl alcohol, myristyl alcohol, cetyl alcohol, stearyl alcohol and oleyl alcohol.

Ring opening products of $C_{8-18}$ 1,2-epoxyalkanes with ethylene glycol are readily obtainable by subjecting the desired epoxyalkanes to an oxirane ring opening reaction The (co-) ethoxylation of the two classes of compounds mentioned is carried out at elevated temperature and pressure in the presence of suitable alkoxylation catalysts. The choice of the alkoxylation catalyst influences the breadth of the range of addition products, the so-called homolog distribution, of the ethylene oxide onto the alcohol. Thus, in the presence of the catalytically active alkali metal alcoholates, such as sodium ethylate, addition products with a broad homolog distribution are obtained whereas, in the presence of hydrotalcite, for example, as catalyst, an extremely narrow homolog distribution is obtained (so-called narrow-range products).

It has surprisingly been found that the compositions according to the invention have better biodegradability than compositions obtained by mixing
ethoxylates of $C_{8-22}$ fatty alcohols with ethoxylates of ring opening products of $C_{8-18}$ 1,2-epoxyalkanes with ethylene glycol.

It is therefore clear that the compositions according to the invention must be different from the compositions just mentioned. In other words, the compositions according to the invention, which are obtainable in a single step by ethoxylation of a mixture of raw materials belonging to two classes, are distinguished by significantly better biodegradability than compositions where the two classes of raw materials are ethoxylated separately from one another, which does of course involve two processes, and the ethoxylates are subsequently mixed together. It has also been found that the compositions according to the invention are also distinguished by favorable toxicological values.

It has also surprisingly been found that aqueous latices based on the compositions according to the invention have better freeze/thaw stabilities and better electrolyte stabilities than compositions obtained by mixing
ethoxylates of $C_{8-22}$ fatty alcohols with ethoxylates of ring opening products of $C_{8-18}$ 1,2-epoxyalkanes with ethylene glycol.

It has also been found that plastic films produced from aqueous latices based on the compositions according to the invention have better blocking resistances than plastic films produced from aqueous latices based on compositions obtained by mixing
ethoxylates of $C_{8-22}$ fatty alcohols with ethoxylates of ring opening products of $C_{8-18}$ 1,2-epoxyalkanes with ethylene glycol.

It is pointed out that, although DE-A 40 06 391 refers to the possibility of carrying out the ethoxylation in a single reaction step (cf. page 3, lines 22-25), this is nothing more to the expert than a reference to this particular method of production. DE-A 40 06 391 remains silent about other useful properties of the compositions thus obtainable. In particular, it does not refer to any effect the production process might have on the biodegradability and toxicological properties of the products.

In addition, DE-A 40 06 391 says nothing about improving the freeze/thaw stability of aqueous polymer dispersions obtainable using the compositions according to the invention. It has equally little to say about the electrolyte stability of aqueous polymer dispersions obtainable using the compositions according to the invention or about the suitability of the compositions according to the invention for the production of non-blocking plastic films.

The compositions according to the invention may be used as sole emulsifiers (primary emulsifiers) in emulsion polymerization. However, the compositions according to the invention may also be used together with anionic, (other) nonionic or cationic emulsifiers.

The emulsifier compositions according to the invention are preferably employed in the form of surfactant concentrates in emulsion polymerization and are used in a quantity of 0.5 to 10% by weight, preferably in a quantity of 1 to 5% by weight and more particularly in a quantity of 1 to 3% by weight, expressed as surfactant concentrate and based on the polymerization mixture.

The present invention also relates to a pourable liquid surfactant concentrate, characterized by a content of 50 to 90% by weight of the above-mentioned compositions according to the invention and 10 to 50% by weight of water.

The pourable liquid surfactant concentrates consist of surfactant mixture and water. The surfactant mixture is present in the surfactant concentrate according to the invention in quantities of 50 to 90% by weight and preferably in quantities of 60 to 90% by weight, based on the surfactant concentrate as a whole.

The surfactant concentrates according to the invention are liquid and pourable over broad temperature ranges. More particularly, the surfactant concentrates are liquid and pourable at 20° C. The lower limit of the temperature range in which the surfactant concentrates according to the invention are still liquid and pourable varies with their composition. In principle, the surfactant concentrates according to the invention are pourable above their solidification points and preferably about 3° C. above their solidification points. The surfactant concentrates according to the invention have Höppler viscosities at 20° C. (DIN 53015) in the range from 0.1 to 3 Pas.

The compositions according to the invention are generally suitable for use as emulsifiers in the production of aqueous latices, i.e. aqueous emulsions or dispersions of polymers and/or copolymers which are normally obtainable by emulsion polymerization. Basically, there are no particular limitations to the nature of the polymers and copolymers in these aqueous latices. However, polymers and copolymers based on the following monomers are particularly preferred: acrylic acid, acrylates, butadiene, methacrylic acid, methacrylates, styrene, vinyl acetate and vinyl versatate.

The compositions according to the invention provide aqueous latices with, in particular, excellent freeze/thaw stability and electrolyte stability. Another effect of the compositions according to the invention is that plastic films produced from these latices are distinguished by high blocking resistance.

The present invention also relates to the use of the compositions according to the invention for the production of aqueous latices having improved freeze/thaw stability. Freeze/thaw stability is a parameter known to the relevant expert. The principle of determining freeze/thaw stability can be found in ISO 1147. According to ISO 1147, the freeze/thaw stability of aqueous latices is determined by cooling aqueous latices to −10° C. and keeping them at that temperature for 16 hours. The latices are then heated to room temperature (ca. +20° C.) and kept at that temperature for 8 hours. The latices are then checked for coagulation. In the absence of coagulation, i.e. if the latex dispersion is stable to coagulation, the described cycle (cooling and thawing) is repeated and the latex is re-checked for coagulation. This freezing/thawing cycle is repeated until either coagulation is observed or a maximum of 5 cycles without coagulation is reached.

According to the present invention, the freeze/thaw stability is determined by the method known from ISO 1147 except that the freezing phases of the cycles are carried out at −25° (and not at −10° C.). These are tougher conditions than those specified in ISO 1147. The aqueous latices are preferably used in quantities of 50 to 100 g for the determination of their freeze/thaw stability.

The present invention also relates to the use of the compositions according to the invention for the production of aqueous latices having improved electrolyte stability. "Electrolyte stability" in the context of the present invention is understood to mean that a polymer dispersion does not coagulate on the addition of 1% by weight or 10% by weight aqueous solutions of inorganic salts of trivalent cations (for example $Al_2(SO_4)_3$) in a ratio by volume of 50:50 (polymer dispersions:salt solution). By coagulation is meant the agglomeration of inadequately stabilized latex particles into coagulate. Coagulation is visually evaluated.

The present invention also relates to a process for the production of plastic films having improved blocking resistance, aqueous latices being spread out in a thin layer and then dried in the usual manner, characterized in that aqueous latices produced using the compositions claimed in claim 1 as emulsifiers are used, these compositions being obtainable by reacting a mixture of a) 20 to 80% by weight of one or more $C_{8-22}$ fatty alcohols and
b) 20 to 80% by weight of one or more ring opening products of $C_{8-18}$ 1,2-epoxyalkanes with ethylene glycol, with ethylene oxide, with the proviso that the ethylene oxide is used in a quantity of 5 to 100 mol per mol of free OH groups present in the sum total of compounds a) and b) used.

"Blocking resistance" in the context of the invention means that dried plastic films or coatings have no tendency to "stick" on exposure to pressure and/or heat. This is of particular importance for applications in the field of paint, textile, paper and leather coatings.

Blocking resistance is determined by the following method. Using a coating knife, a 200 μm wet film is drawn without bubbles onto a PVC film. The films are dried in air for 48 hours. To test blocking resistance, a piece of filter paper cut in a 36×36 mm square (Schleicher & Schuell filter paper, Ref. No. 10312209 or 300009) is placed between two correspondingly large plastic-coated PVC films (36×36 mm) so that the coatings are in contact with the filter paper. This arrangement is subjected to a load of 38 $mN/mm^2$ for 1 minute. Before the test, the filter paper, the metal weight and the polymer film are heated in an oven for 30 minutes at 50° C. After the contact time of 1 minute, the filter paper is removed from the polymer film and the filter residues remaining on the polymer film are determined as the soiled area in %, i.e. the percentage surface area of the plastic-coated PVC film which is covered by residues of paper filter is determined.

The production of plastic films from aqueous latices is carried out in known manner. To this end, aqueous latices are spread out in a thin layer which is then dried. The layer is normally spread out on a hard surface, for example by knife coating. Layer thicknesses of 100 to 2,000 μm are typically adjusted. Apart from knife coating, the layer may also be applied by other typical methods, for example by spray coating, spread coating and dip coating.

In one embodiment, additives of the type normally used for coating purposes, for example inorganic and organic pigments, fillers, such as carbonates, silicon dioxide, silicas, silicates and sulfates, are added to the aqueous latices before they are spread over the substrate.

The present invention also relates to the use of the compositions according to the invention for the production of non-blocking plastic films. For the purposes of this use, aqueous latices are first prepared by emulsion polymerization using the compositions according to the invention, the aqueous latices thus prepared are spread in a thin layer over the substrate and are then dried.

EXAMPLES

Substances Used

Lorol spezial:

$C_{12/14}$ fatty alcohol mixture (Cognis Deutschland GmbH)

Epicol G 24:

1,2-epoxy-$C_{12/14}$-alkane mixture (67% $C_{12}$ and 33% $C_{14}$) (Cognis Deutschland GmbH)

$C_{12/14}$(30EO)sulfate:

sodium salt of a sulfation product of an adduct of 30 mol ethylene oxide and 1 mol Lorol spezial Preparation of the Compounds and Tests Example 1

135 g of a $C_{12/14}$ fatty alcohol mixture were mixed with 85 g of an addition product of 1 mol ethylene glycol onto 1 mol of a 1,2-epoxy-$C_{12/14}$-alkane mixture (67% $C_{12}$ and 33% $C_{14}$). 550 g ethylene oxide were added to the resulting mixture which was then heated for 150 minutes at 180° C. in the presence of 1 g of the catalyst Na methylate.

Comparison Example 1 a) 440 g ethylene oxide were added to 195 g of a $C_{12/14}$ fatty alcohol mixture and the whole was heated for 150 minutes at 180° C. in the presence of 1 g of the catalyst Na methylate.
b) 440 g ethylene oxide were added to 290 g of an addition product of 1 mol ethylene glycol onto 1 mol of a 1,2-epoxy-$C_{12/14}$-alkane mixture (67% $C_{12}$ and 33% $C_{14}$) and the whole was heated for 150 minutes at 180° C. in the presence of 1 g of the catalyst Na methylate.
c) The products obtained in a) and b) were mixed together.

Example 2

135 g of a $C_{12/14}$ fatty alcohol mixture were mixed with 85 g of an addition product of 1 mol ethylene glycol onto 1 mol of a 1,2-epoxy-$C_{12/14}$-alkane mixture (67% $C_{12}$ and 33% $C_{14}$). 1650 g ethylene oxide were added to the resulting mixture which was then heated for 150 minutes at 180° C. in the presence of 1.5 g of the catalyst Na methylate.

Comparison Example 2 a) 550 g ethylene oxide were added to 80 g of a $C_{12/14}$ fatty alcohol mixture and the whole was heated for 150 minutes at 180° C. in the presence of 1 g of the catalyst Na methylate.
b) 440 g ethylene oxide were added to 290 g of an addition product of 1 mol ethylene glycol onto 1 mol of a 1,2-epoxy-$C_{12/14}$-alkane mixture (67% $C_{12}$ and 33% $C_{14}$) and the whole was heated for 150 minutes at 180° C. in the presence of 1 g of the catalyst Na methylate.
c) The products obtained in a) and b) were mixed together.

Example 3

135 g of a $C_{12/14}$ fatty alcohol mixture were mixed with 85 g of an addition product of 1 mol ethylene glycol onto 1 mol of a 1,2-epoxy-$C_{12/14}$-alkane mixture (67% $C_{12}$ and 33% $C_{14}$). 2195 g ethylene oxide were added to the resulting mixture which was then heated for 150 minutes at 180° C. in the presence of 2 g of the catalyst Na methylate.

Comparison Example 3 a) 568 g ethylene oxide were added to 62 g of a $C_{12/14}$ fatty alcohol mixture and the whole was heated for 150 minutes at 180° C. in the presence of 1 g of the catalyst Na methylate.
b) 440 g ethylene oxide were added to 290 g of an addition product of 1 mol ethylene glycol onto 1 mol of a 1,2-epoxy-$C_{12/14}$-alkane mixture (67% $C_{12}$ and 33% $C_{14}$) and the whole was heated for 150 minutes at 180° C. in the presence of 1 g of the catalyst Na methylate.
c) The products obtained in a) and b) were mixed together.

Biological Degradability

The products of Example 1 and Comparison Example 1c) were tested for their biodegradability. The product of Example 1 according to the invention was rated as "readily biodegradable" in the OECD screening test whereas the product of Comparison Example 1c) was only rated as "well biodegradable".

Production of Aqueous Concentrates

The composition of Examples 1 and 2 according to the invention could readily be made up into liquid and pourable surfactant concentrates in water at 20° C. Liquid and pourable concentrates containing 50 to 90% by weight of the composition of Examples 1 and 2 could be prepared without any problems.

Performance Tests

Coagulation

Coagulation was tested as follows for the composition of Examples 1 and 2:

140.0 g ethyl acrylate, 140.0 g methyl methacrylate, 52.5 g butyl acrylate and acrylic acid were used as monomers. First, 10% by weight of the particular monomers was emulsified in ca. 600 g deionized water and, after the addition of 2.0 g sodium lauryl sulfate and 2.0 g potassium peroxodisulfate, the emulsion was heated to 80° C. After the beginning of polymerization, 10 g of the composition of Example 1 (alternatively: Example 2) and the remaining 90% of the monomers were added to the mixture. After a reaction time of ca. 2.5 hours, the polymer dispersion was cooled and filtered through an 80 μm mesh filter. The amount of solid remaining in the filter, the coagulate content, was determined in % by weight solids, based on the solids content of the polymer dispersion. Both where the composition of Example 1 was used and where the composition of Example 2 was used, the coagulate content was below 0.5%. This means that the readily biodegradable compositions according to the invention are eminently suitable as emulsifiers for emulsion polymerization, i.e. the ready degradability has no adverse effect on performance properties.

Stability in Storage

Stability in storage was tested as follows:

First, a styrene/acrylate latex was prepared using the following monomers: styrene, butyl acrylate, acrylic acid and acrylamide in a ratio by weight of 48.3:48.3:2.3:1.1. The aqueous polymer dispersion was prepared as follows:

241.5 g styrene, 241.5 g butyl acrylate, 11.5 g acrylic acid and 5.5 g acrylamide were used as monomers. The monomers were pre-emulsified with 225 g deionized water, 4.3 g $C_{12}$(30EO) sulfate and 1.2 g nonionic emulsifier of Example 2 (or Comparison Example 2c). 10% by volume of this pre-emulsion were introduced into a reactor containing 174 g deionized water, 3.9 g $C_{12}$(30EO) sulfate, 0.35 g nonionic emulsifier of Example 2 (or Comparison Example 2c) and potassium peroxodisulfate. After heating to 90° C., the polymerization reaction was started. The remaining 90% by volume of the pre-emulsion and the initiator solution consisting of 72.8 g of deionized water and 2.2 g potassium peroxodisulfate were continuously added over a period of 3 hours. After another hour's reaction, the mixture was cooled and, after neutralization with 25% ammonia, was filtered.

Stability in storage was evaluated after storage for 4 weeks at 50° C. A polymer dispersion rates as stable if it is free from coagulation, sedimentation and inhomogeneity after the storage period. Evaluation was visual.

The polymer dispersion prepared using the nonionic emulsifier of Example showed none of the instabilities mentioned after storage for 4 weeks at 50° C. By contrast, the latex prepared using the nonionic emulsifier of Comparison Example 2c) was not sufficiently stable and had coagulated.

Freeze/Thaw Stability

Besides the storage properties of the described styrene/acrylate latex, the polymer dispersions were also tested for their freeze/thaw behavior. Freeze/thaw stability was determined as described above, i.e. by the method known from ISO 1147, except that the freezing phases of the cycles were carried out at −25° C. (and not at −10° C.). The polymer dispersion prepared using the nonionic emulsifier of Example 2 was found to be stable at −25° C. By contrast, the styrene/acrylate latex prepared using the nonionic emulsifier of Comparison Example 2c) was found to be unstable at −25° C.

Water Resistance

The water resistance of polymer films produced from the latices was tested as follows:

To prepare the polymer films to be tested, a 100 μm thick wet film (12×75 mm) was applied by coating knife to a glass specimen holder. To dry the wet films, the test specimens were dried for 72 hours at room temperature (23° C.) on a horizontally leveled surface. After drying, the test specimens were stored in tap water for up to 48 hours. For evaluation, the polymer films were visually examined for changes. Evaluation was carried out on a scale of 0 to 5, where 0=clear film, unchanged, 5=white film, and revealed no differences between polymer films prepared from latices based on the nonionic emulsifiers of Example 2 and Comparison Example 2c. After the storage period, both films were given a score of 2 (=slightly cloudy film).

Electrolyte Stability

Electrolyte stability was tested as follows:

First, a vinyl acetate/acrylate latex was prepared using the following monomers: vinyl acetate, vinyl versatate, butyl acrylate and acrylic acid in a ratio by weight of 69.7:19.9:9.9:0.5. The aqueous polymer dispersion was prepared as follows:

1.0 g dodecyl benzenesulfonate, Na salt (25% aqueous solution) and 0.5 g potassium peroxodisulfate were dissolved in 219.0 g deionized water. The resulting solution was introduced into the reactor and heated to 65° C. 2.5% by volume of a pre-emulsion consisting of 203.5 g deionized water, 18.9 g dodecyl benzenesulfonate, Na salt (25% aqueous solution), 0.5 g potassium carbonate, 350.0 g vinyl acetate, 100.0 g vinyl versatate, 50.0 g butyl acrylate, 2.5 g acrylic acid and 10.0 g nonionic emulsifier of Example 2 or Example 3 were added at that temperature. After the polymerization reaction had started, the remaining pre-emulsion (97.5% by volume) was continuously added together with an initiator solution consisting of 60.0 g deionized water and 0.5 g potassium peroxodisulfate over a period of 3 hours starting from a reaction temperature of 80° C. The initiator solution was added at such a rate that it took about 15 minutes longer to add than the pre-emulsion. After another post-polymerization time of 2 hours, the mixture was cooled to a temperature below 30° C., filtered and adjusted to a pH of 7-8 by addition of 7% sodium hydroxide.

The vinyl acetate copolymer dispersions thus prepared were tested for electrolyte stability. To this end, 10 ml of the particular aluminium sulfate solution were added to 10 ml of the polymer dispersion to be tested. The method—already described in the foregoing—is based on the principle that inorganic salts containing trivalent cations behave distinctly more critically than divalent cations. If no coagulation occurs in the electrolyte stability test, the test counts as passed.

Vinyl acetate copolymer dispersions prepared with the nonionic emulsifiers of Example 2 and Example 3 did not coagulate on the addition of aqueous 1 and 10% aluminium sulfate solutions. The dispersion prepared with the nonionic emulsifier of Comparison Example 2 did not meet this requirement.

Blocking Resistance

The blocking resistance of polymer films prepared from the latices was determined by the following method:

Using a coating knife, a 200 μm thick, bubble-free wet film was drawn onto a PVC film. The films were dried in air for 48 hours so that a plastic-coated PVC film was obtained. To test blocking resistance, a piece of filter paper cut in a 36×36 mm square (Schleicher & Schuell filter paper, Ref. No. 10312209 or 300009) was placed between two correspondingly large plastic-coated PVC films (36×36 mm) so that the coatings were in contact with the filter paper. This arrangement was subjected to a load of 38 mN/mm² for 1 minute. Before the test, the filter paper, the metal weight and the polymer film were heated in an oven for 30 minutes at 50° C. After the contact time of 1 minute, the filter paper was removed from the polymer film and the filter residues remaining on the polymer film were determined as the contaminated area in %, i.e. the percentage surface area of the plastic-coated PVC film which was covered by residues of paper filter was determined.

The polymer films based on the described vinyl acetate/acrylate dispersion prepared with the nonionic emulsifiers of Examples 2 and 3 produced very little contamination. Where the nonionic emulsifier of Example 2 was used, the contaminated surface area was only 0.4%; where the nonionic emulsifier of Example 3 was used, it was only 0.2%. However, where the nonionic emulsifiers of Comparison Examples 2 and 3 were used, surface contamination was considerably greater at 4.8% and 1.2%, respectively.

The invention claimed is:

1. A process for making a biodegradable composition consisting of:
    (a) providing from about 20 to 80% by weight of $C_{8-22}$ fatty alcohol;
    (b) providing from about 20 to 80% by weight of a ring opening product of a $C_{8-22}$ 1,2-epoxyalkane with ethylene glycol;
    (c) combining the $C_{8-22}$ fatty alcohol provided in (a) and the ring opening product of the $C_{8-22}$ 1,2-epoxyalkane with ethylene glycol provided in (b) to form a mixture; and
    (d) reacting said mixture with ethylene oxide in the presence of catalyst and at elevated temperature and pressure, with the proviso that the ethylene oxide is used in an amount of from about 30 to 100 mol ethylene oxide per mol of free OH groups present in said mixture.

2. The product consisting of the process of claim 1.

3. A surfactant composition consisting of:
    from about 50 to 90% by weight of the product of the process for making a biodegradable composition consisting of:
        (a) providing from about 20 to 80% by weight of $C_{8-22}$ fatty alcohol;
        (b) providing from about 20 to 80% by weight of a ring opening product of a $C_{8-22}$ 1,2-epoxyalkane with ethylene glycol;
        (c) combining the $C_{8-22}$ in (a) and the ring opening product of the $C_{8-22}$ 1,2-epoxyalkane with ethylene glycol provided in (b) to form a mixture; and
        (d) reacting said mixture with ethylene oxide in the presence of catalyst and at elevated temperature and pressure, with the proviso that the ethylene oxide is used in an amount of from about 30 to 100 mol ethylene oxide per mol of free OH groups present in said mixture;
    and remainder, to 100% water.

4. The composition of claim 3 wherein the composition is liquid and pourable at 20° C.

5. The composition of claim 3 wherein the composition has a Hoppler viscosity at 20° C. of from about 0.1 to 3 Pas.

6. A process for making an aqueous lattice comprising providing an aqueous emulsion containing a polymer and/or copolymer and a surfactant composition, consisting of:
    from about 50 to 90% by weight of the product of the process consisting of:
        (a) providing from about 20 to 80% by weight of $C_{8-22}$ fatty alcohol;
        (b) providing from about 20 to 80% by weight of a ring opening product of a $C_{8-22}$ 1,2-epoxyalkane with ethylene glycol;
        (c) combining the $C_{8-22}$ fatty alcohol provided in (a) and the ring opening product of the $C_{8-22}$ 1,2-epoxyalkane with ethylene glycol provided in (b) to form a mixture; and
        (d) reacting said mixture with ethylene oxide in the presence of catalyst and at elevated temperature and pressure, with the proviso that the ethylene oxide is used in an amount of from about 30 to 100 mol ethylene oxide per mol of free OH groups present in said mixture; and remainder, to 100% water; and
    polymerizing the polymer and/or copolymer to form the aqueous lattice.

7. The process of claim 6 wherein said surfactant composition is present in an amount of from about 0.5% to about 10% by weight, based on the weight of said aqueous emulsion.

8. The process of claim 6 wherein said surfactant composition is present in an amount of from about 1% to about 5% by weight, based on the weight of said aqueous emulsion.

9. The process of claim 6 wherein said surfactant composition is present in an amount of from about 1% to about 3% by weight, based on the weight of said aqueous emulsion.

* * * * *